US012771045B2

(12) United States Patent
Fu

(10) Patent No.: US 12,771,045 B2
(45) Date of Patent: Oct. 20, 2026

(54) DECOUPLING DEVICE AND DECOUPLING METHOD

(71) Applicant: ZTE CORPORATION, Shenzhen (CN)

(72) Inventor: Suidao Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 151 days.

(21) Appl. No.: 18/558,782

(22) PCT Filed: Apr. 6, 2022

(86) PCT No.: PCT/CN2022/085386
§ 371 (c)(1),
(2) Date: Nov. 3, 2023

(87) PCT Pub. No.: WO2022/233212
PCT Pub. Date: Nov. 10, 2022

(65) Prior Publication Data
US 2024/0235058 A1 Jul. 11, 2024

(30) Foreign Application Priority Data
May 6, 2021 (CN) ........................ 202110488752.7

(51) Int. Cl.
*H01Q 21/06* (2006.01)
*H01Q 1/52* (2006.01)

(52) U.S. Cl.
CPC ........... *H01Q 21/062* (2013.01); *H01Q 1/521* (2013.01)

(58) Field of Classification Search
USPC .......................................................... 343/702
See application file for complete search history.

(56) References Cited

U.S. PATENT DOCUMENTS 10,135,133 B2 * 11/2018 Wu ........................ H01Q 1/523
2017/0346179 A1 11/2017 Wu et al.

FOREIGN PATENT DOCUMENTS

CN 106910999 A * 6/2017 ............... H01Q 1/50
CN 107437659 A 12/2017
(Continued)

OTHER PUBLICATIONS

European Patent Office. Extended European Search Report for EP Application No. 22798553.8, mailed Sep. 23, 2024, pp. 1-11.
(Continued)

*Primary Examiner* — Dimary S Lopez Cruz
*Assistant Examiner* — Brandon Sean Woods
(74) *Attorney, Agent, or Firm* — Vivacqua Crane, PLLC

(57) ABSTRACT

A decoupling device and a decoupling method are disclosed. The decoupling device is applied to an antenna array which may include a plurality of antenna elements. The decoupling device may include: a dielectric substrate (110) located above the antenna elements; first decoupling units (120) arranged on the dielectric substrate (110), each first decoupling unit (120) being located above a middle position between every two E-plane coupled antenna elements; second decoupling units (130) arranged on the dielectric substrate (110), the second decoupling units (130) being located above each antenna element; and third decoupling units (140) arranged on the dielectric substrate (110), each third decoupling unit (140) being located above a middle position between every two H-plane coupled antenna elements.

17 Claims, 12 Drawing Sheets

(56) References Cited

FOREIGN PATENT DOCUMENTS

| | | | |
|---|---|---|---|
| CN | 110085997 | A | 8/2019 |
| CN | 111129769 | A | 5/2020 |
| CN | 112467378 | A | 3/2021 |

OTHER PUBLICATIONS

Guo, J., et al. "Meta-Surface Antenna Array Decoupling Designs for Two Linear Polarized Antennas Coupled in H-Plane and E-Plane," IEEE Access, vol. 7, 2019, pp. 100442-100452.

Fu, S. "Research on Bandwidth Enhancement and Decoupling for Mobile Communication Antennas," Dissertation, Southeast University School of Information Science and Engineering, Aug. 2020, pp. 1-168.

International Searching Authority. International Search Report and Written Opinion for PCT Application No. PCT/CN2022/085386 and English translation, mailed Jun. 10, 2022, pp. 1-12.

Wu, K., et al. "Array-Antenna Decoupling Surface," IEEE Transactions on Antennas and Propagation, vol. 65, No. 12, Dec. 2017, pp. 6728-6738.

The State Intellectual Property Office of People's Republic of China. First Office Action and Search Report for CN Application No. 202110488752.7 and English translation, mailed Jul. 22, 2025, pp. 1-20.

* cited by examiner

DECOUPLING DEVICE AND DECOUPLING METHOD

CROSS-REFERENCE TO RELATED APPLICATION

This application is a national stage filing under 35 U.S.C. § 371 of international application number PCT/CN2022/085386 filed on Apr. 6, 2022, which claims priority to Chinese patent application No. 202110488752.7 filed on May 6, 2021. The contents of these applications are incorporated herein by reference in their entirety.

TECHNICAL FIELD

The present disclosure relates to the technical field of wireless communication, in particular to a decoupling device and a decoupling method.

BACKGROUND

The multiple input multiple output (MIMO) antenna technology, implemented in the fifth-generation (5G) mobile communication, is regarded as one of the core technologies of 5G owing to its ability to enhance the reliability of communication systems and expand channel capacity. Antenna mutual coupling, as a widely prevalent physical phenomenon, will significantly deteriorate the performance of a MIMO antenna system, causing problems such as increased independent channel correlation, deteriorated active standing waves, decreased gain, and deteriorated signal-to-noise ratio. Further, in order to reduce the tower top lease cost, an antenna array is required to be miniaturized, which further enhances mutual coupling. Therefore, reducing antenna mutual coupling has become the focus of Massive-MIMO antenna research.

In an antenna array, the coupling modes can be classified into an E-plane coupling mode, an H-plane coupling mode and a diagonal coupling mode that lies between the E-plane coupling mode and the H-plane coupling mode, based on the relative position relationship between antenna elements. Existing decoupling techniques can only realize decoupling in a single coupling mode.

SUMMARY

The present disclosure aims at solving one of the technical problems present in certain scenarios at least to some extent, and provides a decoupling device and a decoupling method.

In accordance with a first aspect of the present disclosure, an embodiment provides a decoupling device applied to an antenna array, the antenna array may include a plurality of antenna elements, and the decoupling device may include: a dielectric substrate located above the plurality of antenna elements; first decoupling units arranged on the dielectric substrate, each first decoupling unit being located above a middle position between every two E-plane coupled antenna elements; second decoupling units arranged on the dielectric substrate, the second decoupling units being located above each antenna element; and third decoupling units arranged on the dielectric substrate, each third decoupling unit being located above a middle position between every two H-plane coupled antenna elements.

In accordance with a second aspect of the present disclosure, an embodiment provides a decoupling method applied to an antenna array, the antenna array may include a plurality of antenna elements, and the decoupling method may include: providing a first decoupling unit above a middle position between every two E-plane coupled antenna elements; providing a second decoupling unit above each antenna element; and providing a third decoupling unit above a middle position between every two H-plane coupled antenna elements.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

The present disclosure will be explained hereinafter with reference to the accompanying drawings and embodiments.

DETAILED DESCRIPTION

This section will describe several embodiments of the present disclosure in detail, and some embodiments of the present disclosure are shown in the accompanying drawings. The accompanying drawings are used to supplement the text description of the specification with graphic illustrations, so that each technical feature and the overall technical scheme of the present disclosure can be intuitively and vividly understood. However, the accompanying drawings should not be construed as limiting the scope of protection application the present disclosure.

In the description of the present disclosure, the meaning of "several" is one or a plurality; the meaning of "a plurality of" is two or more; "greater than", "less than", "more than", etc. are to be construed as excluding a given figure; and "above", "below", "within", etc. are to be construed as including a given figure. If "first" and "second", etc. are referred to, it is only for the purpose of distinguishing technical features, and shall not be construed as indicating or implying relative importance or implying the number of the indicated technical features or implying the sequence of the indicated technical features.

In the description of the present disclosure, unless otherwise explicitly defined, the terms such as "arrange", "install", and "connect" should be construed in a broad sense, and those skilled in the art can determine the specific meanings of the above terms in the present disclosure in a rational way in conjunction with the specific contents of the technical schemes.

An embodiment of the present disclosure provides a decoupling device and a decoupling method to realize both E-plane decoupling and H-plane decoupling for an antenna array.

The embodiments of the present disclosure will be explained below with reference to the accompanying drawings.

Figure 2:
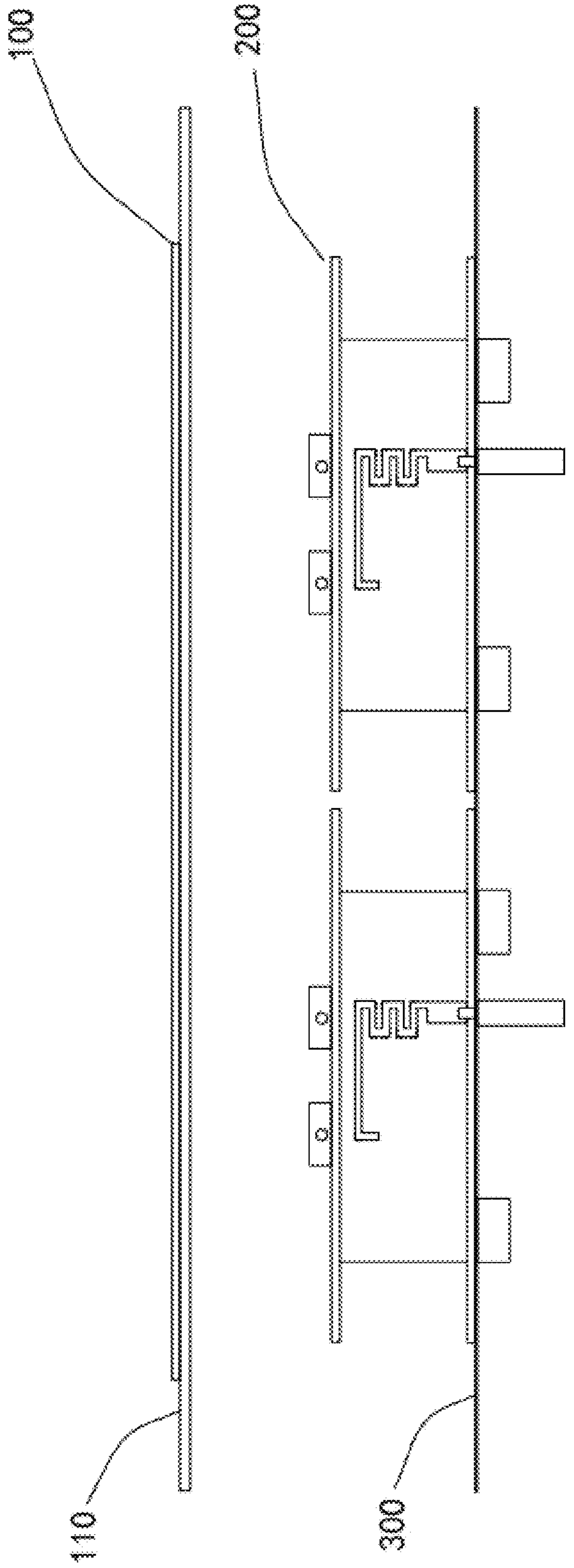
FIG. 2 is a side view of a decoupling device provided by an embodiment of the present disclosure.
Figure 3:
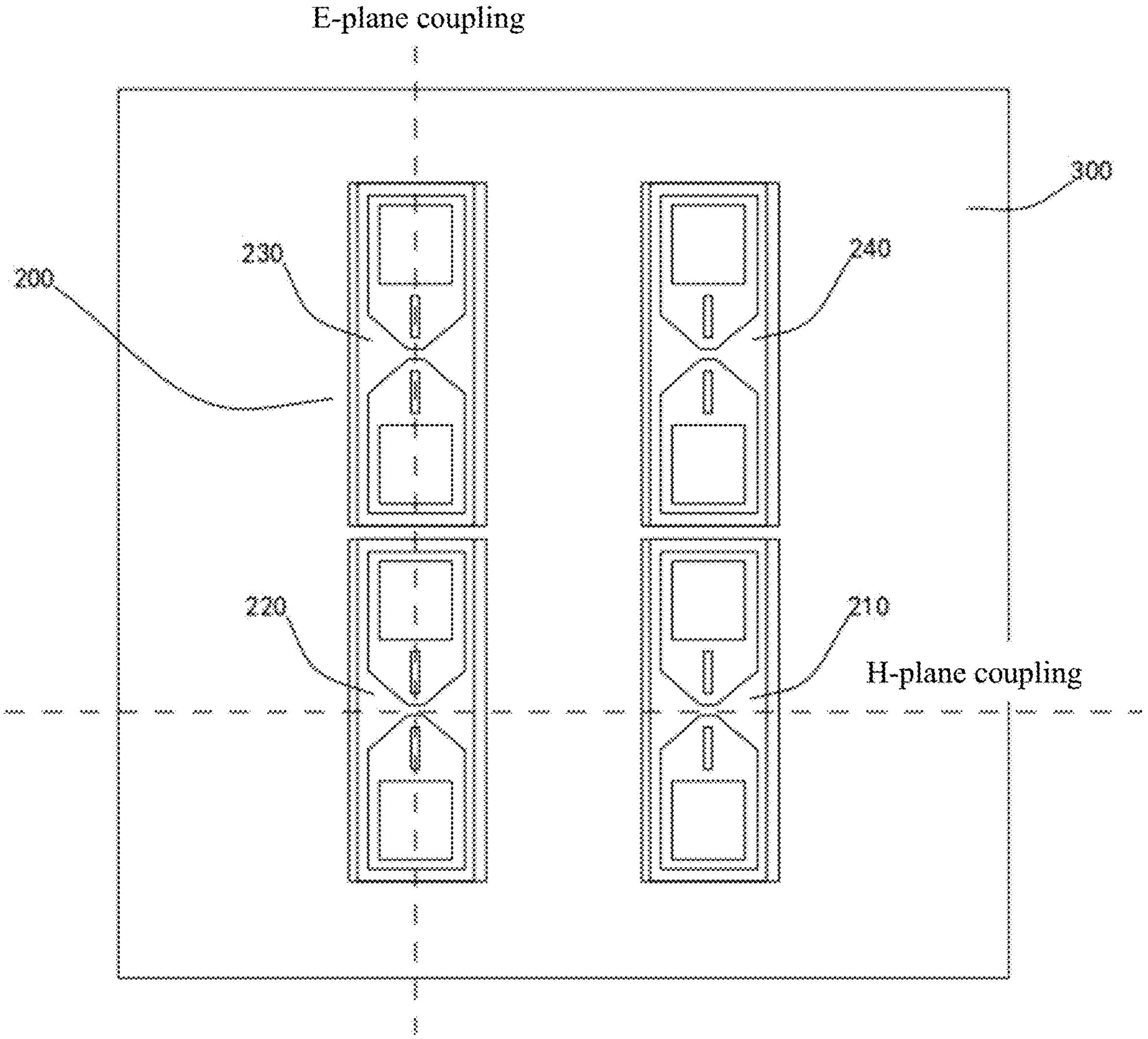
FIG. 3 is a structural diagram of an antenna array provided by an embodiment of the present disclosure.

An embodiment of a first aspect of the present disclosure provides a decoupling device applied to an antenna array. The antenna array includes a plurality of antenna elements. The antenna array in this embodiment is a 2×2 planar antenna array 200, which is placed on a reflective floor 300 as shown in FIGS. 2 and 3. The planar antenna array 200 includes a first antenna element 210, a second antenna element 220, a third antenna element 230 and a fourth antenna element 240. The first antenna element 210 and the second antenna element 220 are two antenna elements coupled in the H-plane, and the second antenna element 220 and the third antenna element 230 are two antenna elements coupled in the E-plane. Similarly, the third antenna element 230 and the fourth antenna element 240 are two antenna elements coupled in the H-plane, and the first antenna element 210 and the fourth antenna element 240 are two antenna elements coupled in the E-plane.

The decoupling device 100 covers the planar antenna array 200, and includes a dielectric substrate 110, first decoupling units 120, second decoupling units 130 and third decoupling units 140.

Figure 1:
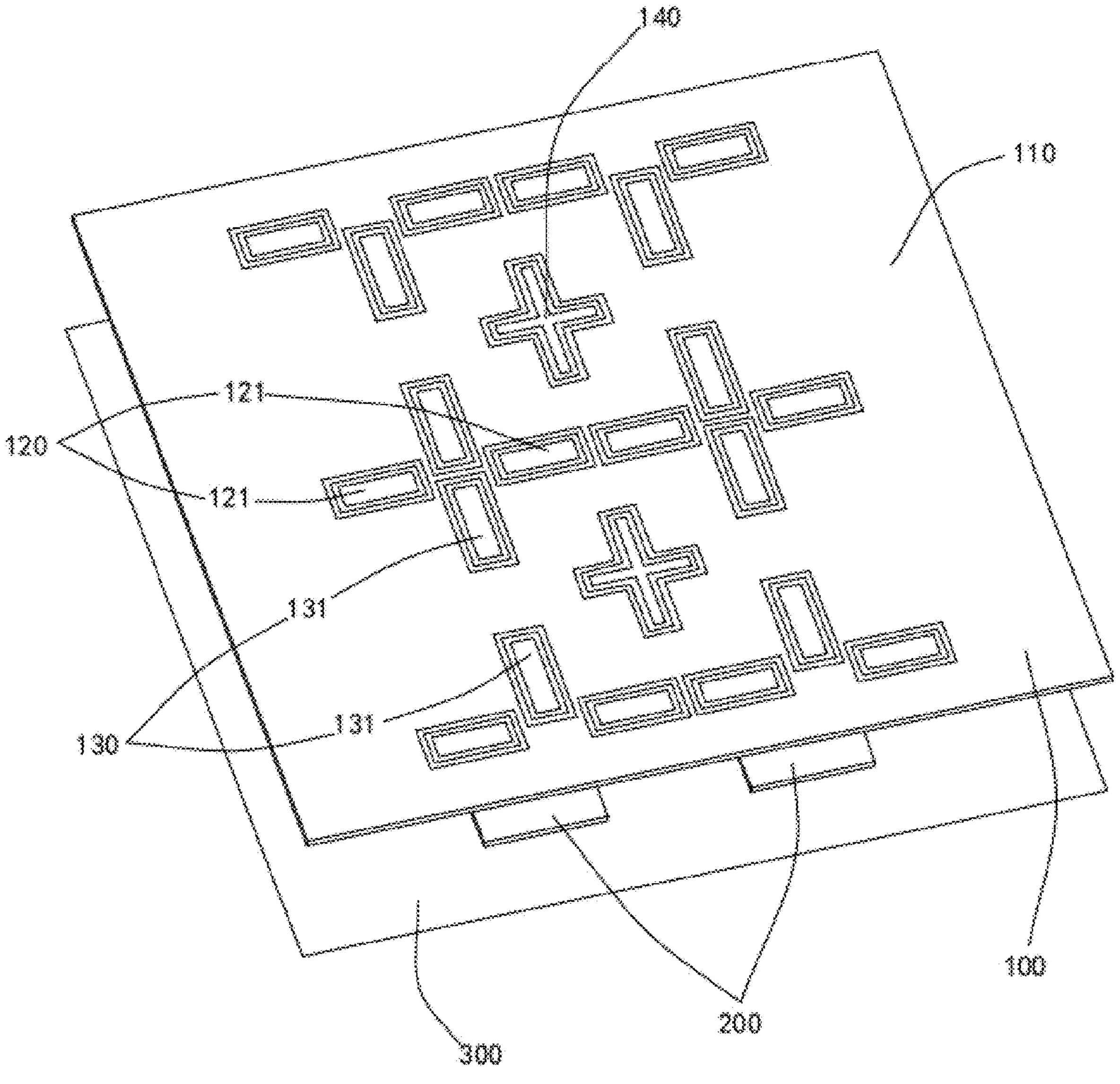
FIG. 1 is a perspective view of a decoupling device provided by an embodiment of the present disclosure.

As shown in FIGS. 1 and 2, the dielectric substrate 110 is located above the plurality of antenna elements, that is, above the planar antenna array 200, the dielectric substrate 110 only serves as a physical support for the first decoupling units 120, the second decoupling units 130 and the third decoupling units 140, and the dielectric substrate 110 may be of a one-layer or multi-layer structure. In some possible implementations, the dielectric substrate 110 may also be an antenna housing.

The first decoupling units 120 are arranged on the dielectric substrate 110, and each first decoupling unit 120 is located above a middle position between every two E-plane coupled antenna elements, that is, one first decoupling unit 120 is arranged above the middle position between the second antenna element 220 and the third antenna element 230, and the other first decoupling unit 120 is arranged above the middle position between the first antenna element 210 and the fourth antenna element 240.

The second decoupling units 130 are arranged on the dielectric substrate 110, and the second decoupling units 130 are located above each antenna element, that is, the second decoupling units 130 are arranged above the first antenna element 210, the second antenna element 220, the third antenna element 230 and the fourth antenna element 240 respectively.

The third decoupling units 140 are arranged on the dielectric substrate 110, and each third decoupling unit 140 is located above a middle position between every two H-plane coupled antenna elements, that is, one third decoupling unit 140 is arranged above the middle position between the first antenna element 210 and the second antenna element 220, and the other third decoupling unit 140 is arranged above the middle position between the third antenna element 230 and the fourth antenna element 240.

In this embodiment, the first decoupling units 120 are arranged above the middle positions between every two E-plane coupled antenna elements and the second decoupling units 130 are arranged above each antenna element, E-plane scattered waves with equal amplitude and opposite phase to E-plane coupled waves are generated by the first decoupling units 120 and the second decoupling units 130, and the E-plane scattered waves and the E-plane coupled waves cancel each other out to realize E-plane decoupling; in addition, the second decoupling units 130 will also generate H-plane scattered waves to realize partial H-plane decoupling; furthermore, the third decoupling units 140 are arranged above the middle positions between every two H-plane coupled antenna elements, H-plane scattered waves with equal amplitude and opposite phase to H-plane coupled waves are generated by the second decoupling units 130 and the third decoupling units 140, and the H-plane scattered waves and the H-plane coupled waves cancel each other out to realize H-plane decoupling; and through the joint action of the first decoupling units 120, the second decoupling units 130 and the third decoupling units 140, both E-plane decoupling and H-plane decoupling are realized for the antenna array.

In an embodiment, the first decoupling unit 120 includes a first metal patch 121 or a plurality of first metal patches 121 arranged in an H-plane direction, and a geometric center of the first decoupling unit 120 is located directly above the middle position between the two corresponding E-plane coupled antenna elements.

Figure 4:
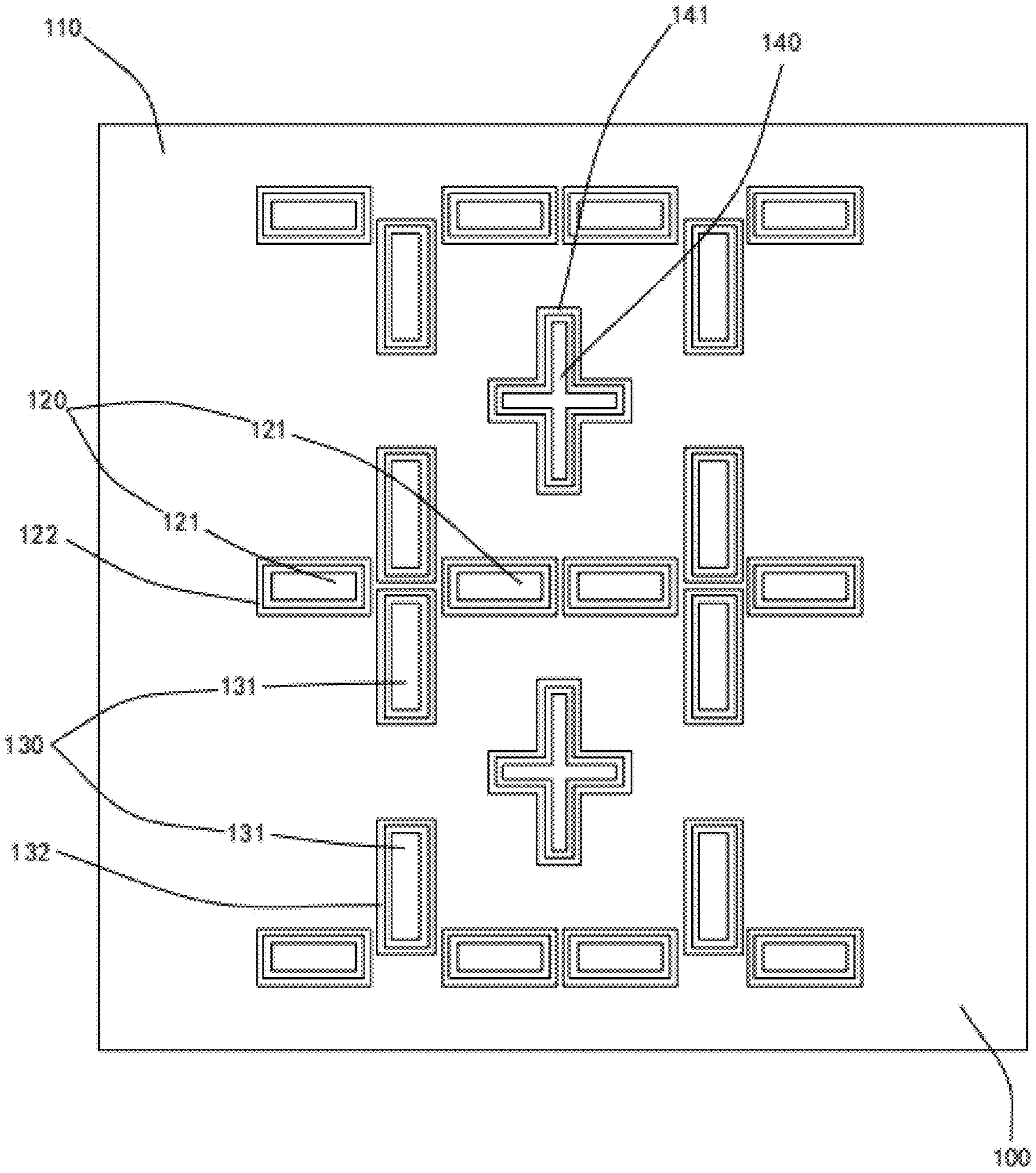
FIG. 4 is a structural diagram of a decoupling device provided by an embodiment of the present disclosure.

It should be noted that, as shown in FIG. 3, the first antenna element 210 and the second antenna element 220 are two antenna elements coupled in the H-plane, the third antenna element 230 and the fourth antenna element 240 are two antenna elements also coupled in the H-plane, and the H-plane direction in FIG. 4 is horizontal. As shown in FIG. 4, in this embodiment, each first decoupling unit 120 includes two first metal patches 121 arranged along the H-plane direction, that is, there are two first metal patches 121 arranged in the horizontal direction above the middle position between the second antenna element 220 and the third antenna element 230, and there are also two first metal patches 121 arranged in the horizontal direction above the middle position between the first antenna element 210 and the fourth antenna element 240. The first decoupling unit 120 can also include only one first metal patch 121, or three or more first metal patches 121, which is not limited in this application, as long as the geometric center of the first decoupling unit 120 is located directly above the middle position between two E-plane coupled antenna elements.

The first metal patch 121 may be rectangular, triangular, circular, cross-shaped, I-shaped, C-shaped or in other similar shapes.

In addition, a length of the first metal patch 121 in the H-plane direction ranges from 0.01λc to 0.25λc, where λc is a wavelength of electromagnetic waves corresponding to a central frequency of the antenna array. The first metal patch 121 in this size range is an electrically small metal patch. Electromagnetic scattered waves of the electrically small metal patch structure are isotropic, meaning that the amplitudes and phases of scattered waves in different directions are equal at the same distance.

Referring to FIG. 4, in an embodiment, the first metal patch 121 is sleeved with a first metal ring 122.

It can be understood that the first metal patch 121 can be of a single metal patch structure, or an internal nested structure, and the internal nested structure refers to a structure in which the first metal patch 121 is sleeved with a first metal ring 122. The nested metal patch structure helps increase the amplitude of the scattered waves and improve the decoupling effect.

In an embodiment, each first metal patch 121 includes a plurality of metal patch pieces arranged in a direction perpendicular to the H-plane direction.

Figure 5:
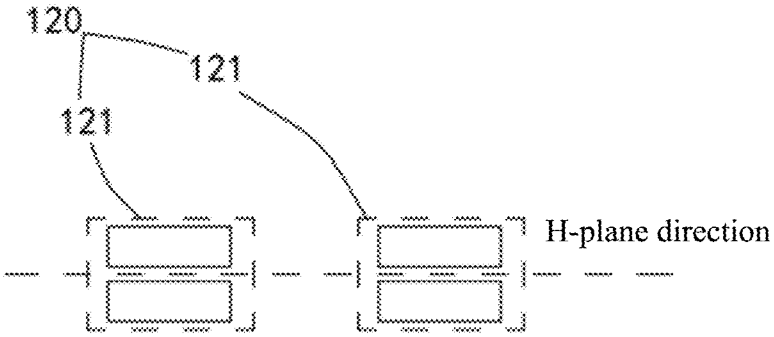
FIG. 5 is a structural diagram of a first decoupling unit of a decoupling device provided by an embodiment of the present disclosure.

It can be understood that on the basis that the first decoupling unit 120 includes a plurality of first metal patches 121 arranged in the H-plane direction, each first metal patch 121 includes a plurality of metal patch pieces arranged in the direction perpendicular to the H-plane direction, that is, the first decoupling unit 120 is formed by arranging a plurality of metal patch pieces in a two-dimensional array. Specifically, as shown in FIG. 5, the first decoupling unit 120 includes two first metal patches 121 arranged in the H-plane direction, and each first metal patch 121 includes two metal patch pieces arranged in the direction perpendicular to the H-plane direction, that is, the first decoupling unit 120 is formed by arranging four metal patch pieces in a two-dimensional array.

In an embodiment, each first metal patch 121 includes a plurality of metal patch pieces stacked in layers.

It can be understood that the first metal patch 121 is formed by the plurality of stacked metal patch pieces to form a three-dimensional spatial structure, which can achieve different decoupling effects.

In an embodiment, the second decoupling unit 130 includes a second metal patch 131 or a plurality of second metal patches 131 arranged in an E-plane direction, and a geometric center of the second decoupling unit 130 is located directly above the corresponding antenna element.

It should be noted that, as shown in FIG. 3, the second antenna element 220 and the third antenna element 230 are two antenna elements coupled in the E-plane, the first antenna element 210 and the fourth antenna element 240 are two antenna elements also coupled in the E-plane, and the E-plane direction in FIG. 4 is vertical. As shown in FIG. 4, in this embodiment, each second decoupling unit 130 includes two second metal patches 131 arranged in the E-plane direction, that is, there are two second metal patches 131 arranged in the vertical direction above each of the first antenna element 210, the second antenna element 220, the third antenna element 230 and the fourth antenna element 240. The second decoupling unit 130 can also include only one second metal patch 131, or three or more second metal patches 131, which is not limited in this application, as long as the geometric center of the second decoupling unit 130 is located directly above the corresponding antenna element.

The second metal patch 131 may be rectangular, triangular, circular, cross-shaped, I-shaped, C-shaped or in other similar shapes.

In addition, a length of the second metal patch 131 in the E-plane direction ranges from 0.01 λc to 0.25 λc, where λc is a wavelength of electromagnetic waves corresponding to a central frequency of the antenna array. The second metal patch 131 in this size range is an electrically small metal patch. Electromagnetic scattered waves of the electrically small metal patch structure are isotropic, meaning that the amplitudes and phases of scattered waves in different directions are equal at the same distance.

Referring to FIG. 4, in an embodiment, the second metal patch 131 is sleeved with a second metal ring 132.

It can be understood that the second metal patch 131 can be of a single metal patch structure, or an internal nested structure, and the internal nested structure refers to a structure in which the second metal patch 131 is sleeved with a second metal ring 132. The nested metal patch structure helps increase the amplitude of the scattered waves and improve the decoupling effect.

In an embodiment, each second metal patch 131 includes a plurality of metal patch pieces arranged in a direction perpendicular to the E-plane direction.

Figure 6:
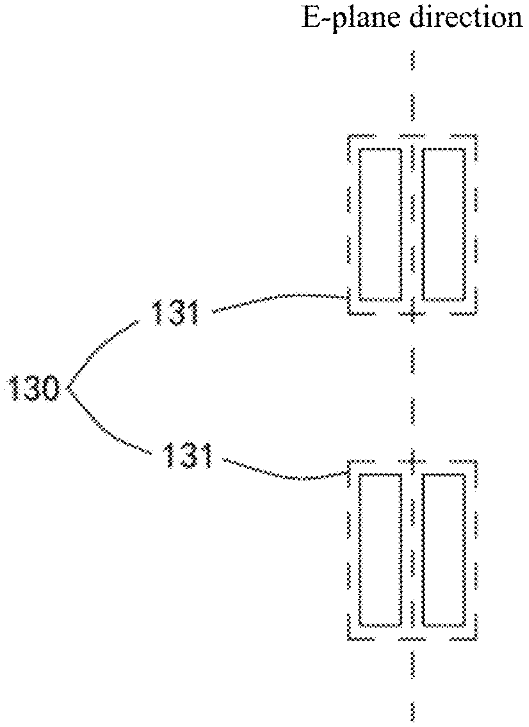
FIG. 6 is a structural diagram of a second decoupling unit of a decoupling device provided by an embodiment of the present disclosure.

It can be understood that on the basis that the second decoupling unit 130 includes a plurality of second metal patches 131 arranged in the E-plane direction, each second metal patch 131 includes a plurality of metal patch pieces arranged in the direction perpendicular to the E-plane direction, that is, the second decoupling unit 130 is formed by arranging a plurality of metal patch pieces in a two-dimensional array. Specifically, as shown in FIG. 6, the second decoupling unit 130 includes two second metal patches 131 arranged in the E-plane direction, and each second metal patch 131 includes two metal patch pieces arranged in the direction perpendicular to the E-plane direction, that is, the second decoupling unit 130 is formed by arranging four metal patch pieces in a two-dimensional array.

In an embodiment, each second metal patch 131 includes a plurality of metal patch pieces stacked in layers.

It can be understood that the second metal patch 131 is formed by the plurality of stacked metal patch pieces to form a three-dimensional spatial structure, which can achieve different decoupling effects.

In an embodiment, the third decoupling unit 140 includes a third metal patch 141 or a plurality of third metal patches 141 stacked in layers, and a geometric center of the third decoupling unit 140 is located directly above the middle position between the two corresponding H-plane coupled antenna elements.

The third decoupling unit 140 can be composed of only one third metal patch 141, or a plurality of third metal patches 141 stacked in layers to achieve different decoupling effects. The third metal patch 141 may be rectangular, triangular, circular, cross-shaped, I-shaped, C-shaped or in other similar shapes.

In addition, a length of the third metal patch 141 in the H-plane direction ranges from 0.40λc to 0.80λc, where λc is a wavelength of electromagnetic waves corresponding to a central frequency of the antenna array. The third metal patch 141 in this size range is an electrically large metal patch, and the electrically large size refers to both the physical length and the length through which an effective current flows, that is, electrical length.

Referring to FIG. 4, in an embodiment, the third metal patch 141 is sleeved with a third metal ring 142.

It can be understood that the third metal patch 141 can be of a single metal patch structure, or an internal nested structure, and the internal nested structure refers to a structure in which the third metal patch 141 is sleeved with a third metal ring 142. The nested metal patch structure helps reduce the physical size of the electrically large metal patch, increase the amplitude of the scattered waves and improve the decoupling effect.

It should be noted that the first decoupling unit 120, the second decoupling unit 130 and the third decoupling unit 140 can be at the same height or at different heights. The first decoupling unit 120, the second decoupling unit 130, and the third decoupling unit 140 are positioned at a height between 0.05 $\lambda c$ and 1.0 $\lambda c$ from the antenna elements.

A size of the first decoupling unit 120 increases with the decrease of a distance between every two E-plane coupled antenna elements, but does not exceed a distance between two H-plane coupled antenna elements. A size of the second decoupling unit 130 increases as a distance between every two E-plane-coupled antenna elements decreases or as a distance between every two H-plane-coupled antenna elements decreases, but does not exceed the distance between two E-plane-coupled antenna elements. A size of the third decoupling unit 140 is determined by the operating frequency of antennas, and is independent of the distance between the antenna elements.

The first decoupling unit 120, the second decoupling unit 130 and the third decoupling unit 140 can be extended along an x axis and a y axis according to a scale of the planar antenna array, making them suitable for antenna arrays with any number of antenna elements.

Next, the decoupling device provided by this application will be explained in combination with several embodiments.

A decoupling device 100 applied to a planar antenna array to realize dual-mode decoupling, as shown in FIGS. 1 to 4, covers a 2×2 planar antenna array 200 and includes: a dielectric substrate 110, first decoupling units 120, second decoupling units 130 and third decoupling units 140.

The planar antenna array 200 is placed on a reflective floor 300, the spacing between antenna elements in an x-axis direction is 47 mm ($0.55\lambda_{3.5\ GHz}$), and the spacing in a y-axis direction is 43 mm ($0.5\lambda_{3.5\ GHz}$). The antenna element is a printed electric dipole antenna.

The first decoupling unit 120, the second decoupling unit 130 and the third decoupling unit 140 are all etched on an upper surface of the dielectric substrate 110.

The first decoupling unit 120 is composed of two electrically small first metal patches 121, and the first metal patches 121 are arranged in an H-plane direction of the antenna. Geometric centers of the first decoupling units 120 are located directly above middle positions between every two E-plane coupled antenna elements.

The second decoupling unit 130 is composed of two electrically small second metal patches 131. To avoid excessive influence on the decoupling effect of the first decoupling unit 120, the second metal patches 131 are arranged in an E-plane direction of the antenna from two ends of the antenna element. Geometric centers of the second decoupling units 130 are located directly above each antenna element.

The third decoupling unit 140 is composed of an electrically large third metal patch 141, and geometric centers of the third decoupling units 140 are located above middle positions between every two H-plane coupled antenna elements.

The first metal patch 121 has a length L1 of 16 mm ($0.19\lambda_{3.5\ GHz}$) and a width W1 of 8 mm ($0.09\lambda_{3.5\ GHz}$).

The second metal patch 131 has a length L2 of 19 mm ($0.22\lambda_{3.5\ GHz}$) and a width W2 of 8 mm ($0.09\lambda_{3.5\ GHz}$).

The third metal patch 141 has a length L3+L4 of 46 mm ($0.54\lambda_{3.5\ GHz}$) and a width W3 of 6 mm ($0.07\lambda_{3.5\ GHz}$).

The first decoupling unit 120, the second decoupling unit 130 and the third decoupling unit 140 are located at the same height, with a distance H of 14 mm from the antenna array 200 ($0.16\lambda_{3.5\ GHz}$).

The first metal patch 121 is a rectangular metal patch, and sleeved with a first metal ring 122 to enhance the amplitude of scattered waves.

The second metal patch 131 is a rectangular metal patch, and sleeved with a second metal ring 132 to enhance the amplitude of scattered waves.

The third metal patch 141 is a cross-shaped metal patch, and sleeved with a cross-shaped third metal ring 142 to reduce the physical size of the electrically large metal patch and enhance the amplitude of scattered waves.

It should be noted that the first metal patch 121 and the second metal patch 131 can be made in shapes other than rectangle and can have different types of structures other than annular nested structure. The third metal patch 141 can be made in shapes other than cross shape and can have different types of structures other than annular nested structure.

The decoupling device 100 can be fixed above the planar antenna array through plastic supports, or can be arranged inside an antenna housing.

Figure 8:
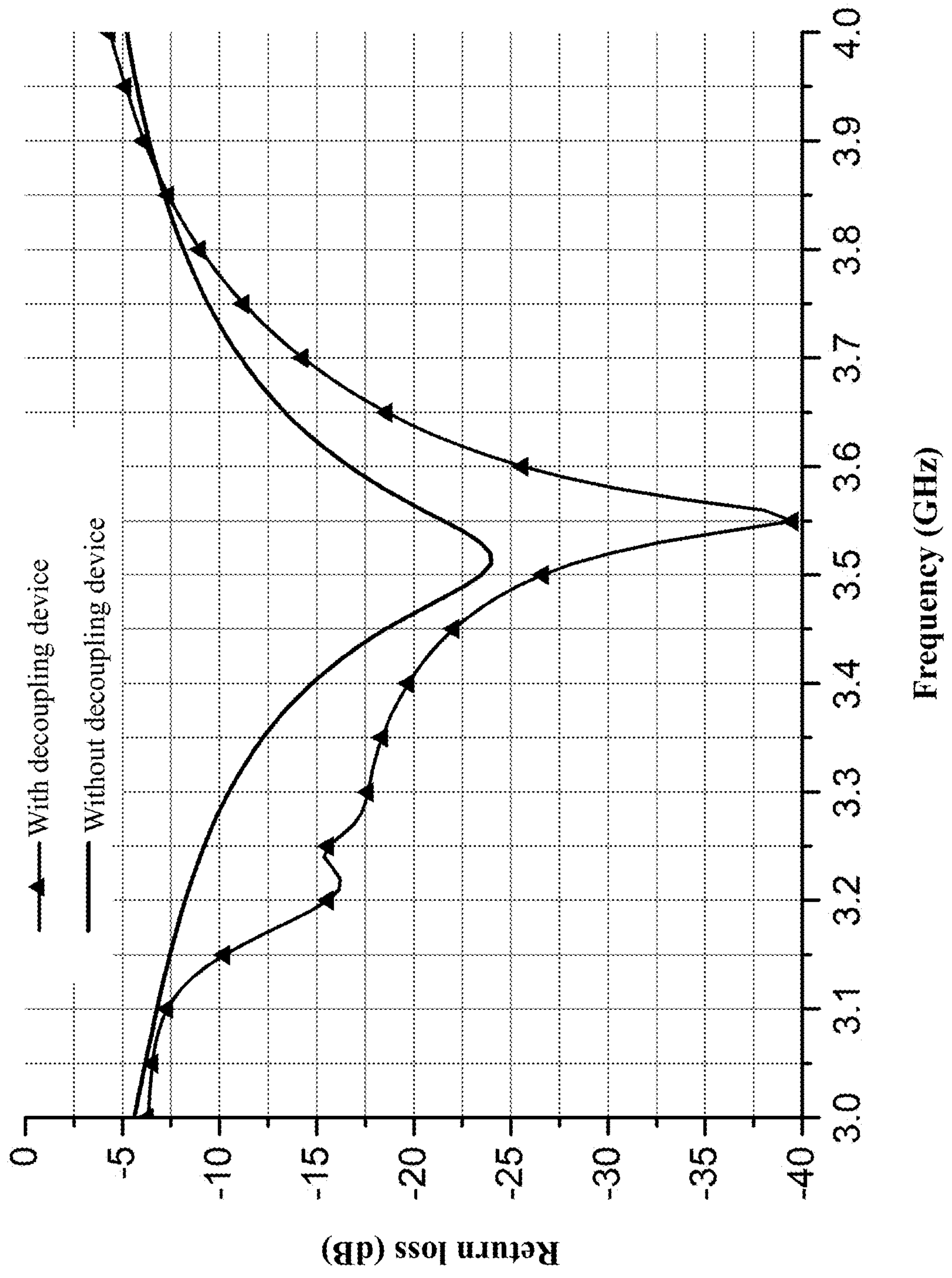
FIG. 8 is a graph of return loss before and after using a decoupling device in an implementation provided by an embodiment of the present disclosure.
Figure 9:
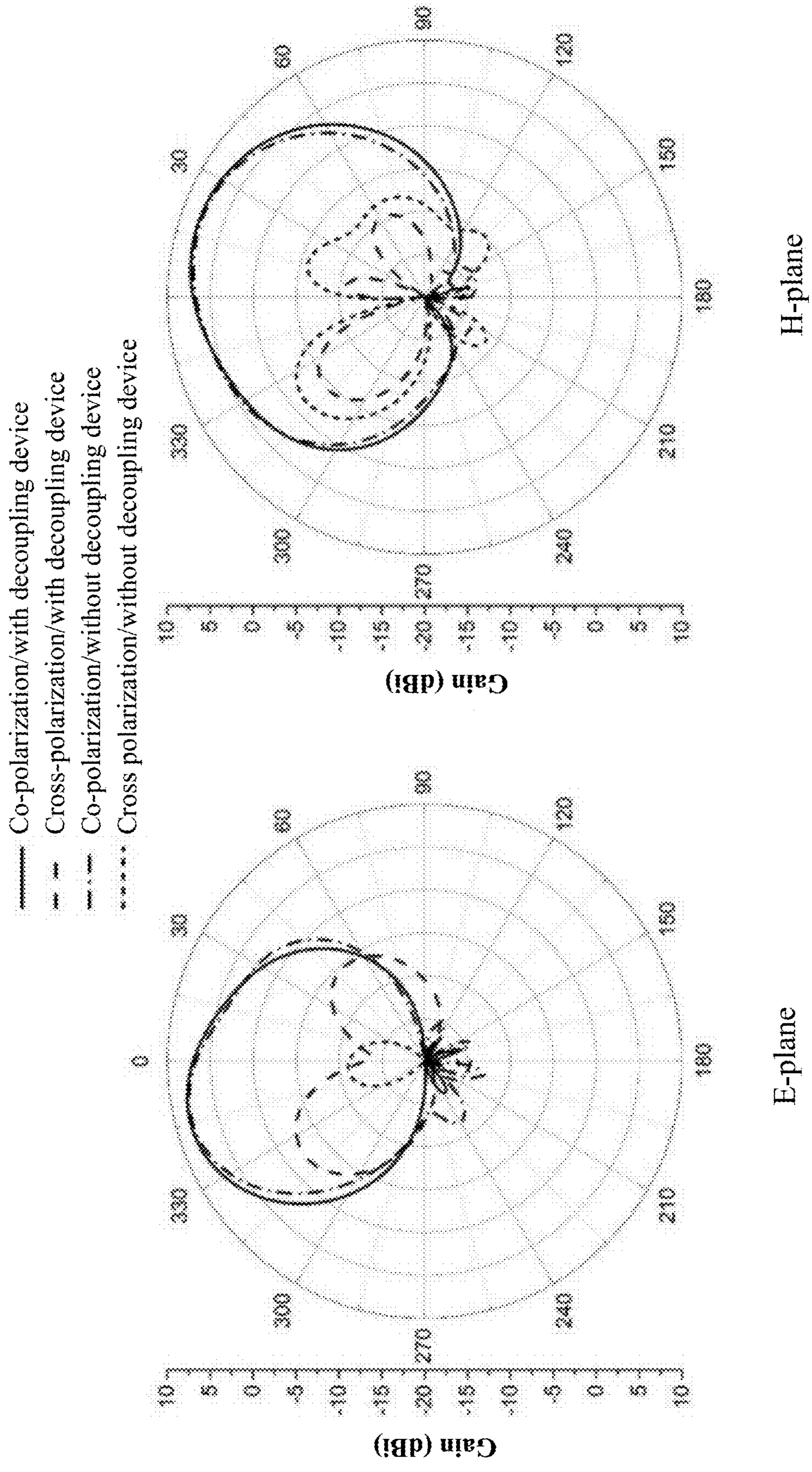
FIG. 9 is a directional diagram before and after using a decoupling device in an implementation provided by an embodiment of the present disclosure.
Figure 10:
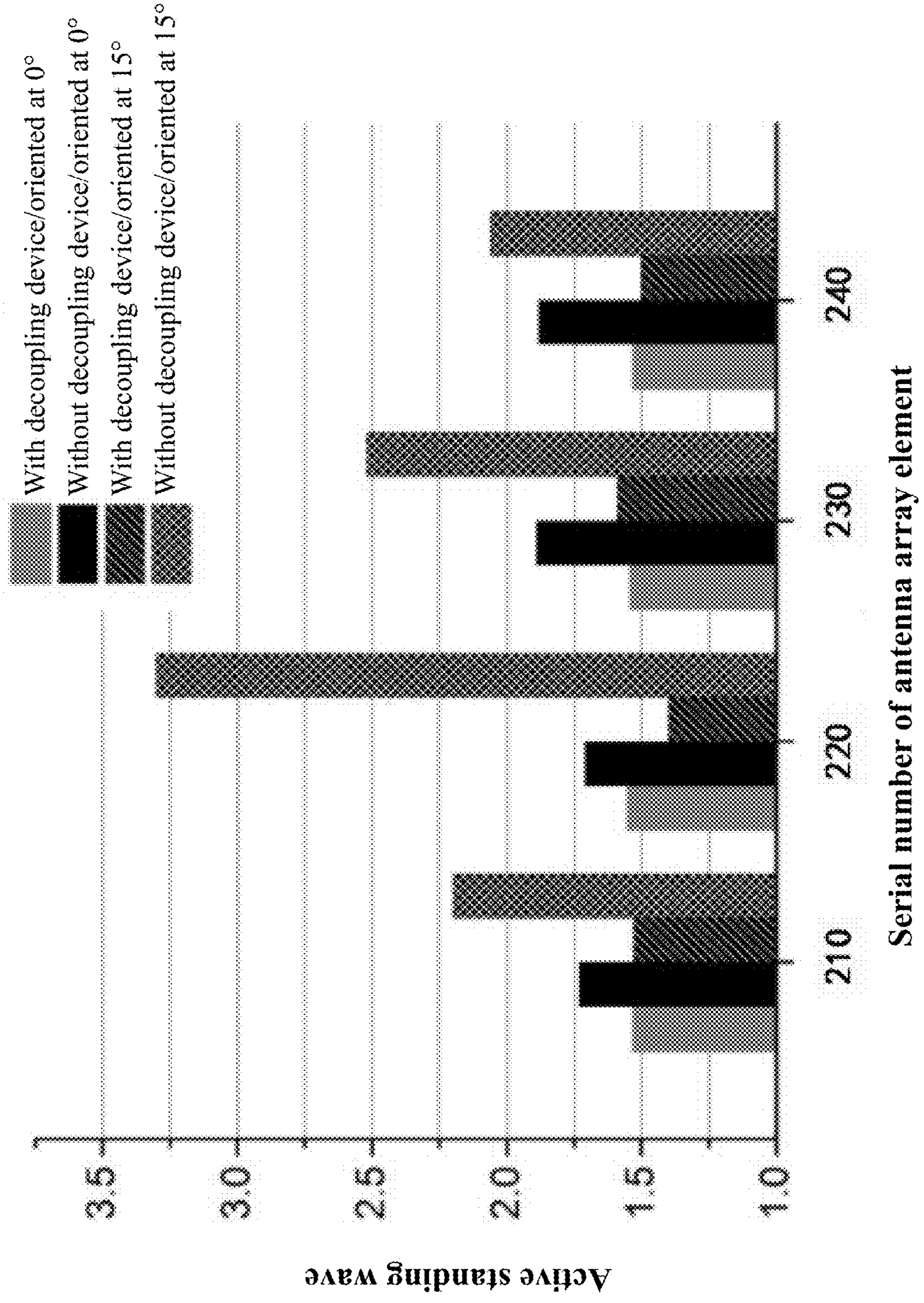
FIG. 10 is a diagram of active standing waves before and after using a decoupling device in an implementation (two-element sub-array) provided by an embodiment of the present disclosure.

The decoupling device 100 provided by this example, which is applied to a planar antenna array to realize dual-mode decoupling, can improve impedance characteristics and radiation characteristics of antennas on the basis of significantly reducing E-plane and H-plane mutual coupling of MIMO antennas. From FIG. 7 which is a graph of mutual coupling before and after using the decoupling device, it can be seen that E-plane and H-plane mutual coupling can be reduced by more than 10 dB within a relative bandwidth of 6% (3.4 to 3.6 GHz), and E-plane and H-plane mutual coupling can be reduced by more than 5 dB within a relative bandwidth of 12% (3.3 to 3.7 GHz); from FIG. 8 which is a graph of return loss before and after using the decoupling device, it can be seen that an impedance bandwidth of antennas can be increased from 5.7% (3.4 to 3.6 GHz) to 14.5% (3.2 to 3.7 GHz); from FIG. 9 which is a directional diagram before and after using the decoupling device, it can be seen that antenna gain can be increased from 8.0 dBi to 8.3 dBi; and from FIG. 10 which is a diagram of active standing waves before and after using the decoupling device, it can be seen that a maximum active standing wave of MIMO antennas can be reduced from 1.9 to 1.55 when a beam is oriented at 0°, and from 3.3 to 1.6 when a beam is oriented at 15°. The decoupling device 100 can be extended periodically along the x-axis and the y-axis, and is applicable to planar MIMO antennas with any number of antenna elements. The decoupling device 100 can cover the MIMO antennas and be integrated inside an antenna housing, and features a simple structure, convenient implementation and low cost.

E-plane scattered waves generated by the first decoupling units 120 and the second decoupling units 130 are equal in amplitude and opposite in phase to E-plane coupled waves, and the scattered waves and the E-plane coupled waves cancel each other out to realize E-plane decoupling. Meanwhile, H-plane scattered waves generated by the second decoupling units 130 will realize partial H-plane decoupling.

Figure 11:
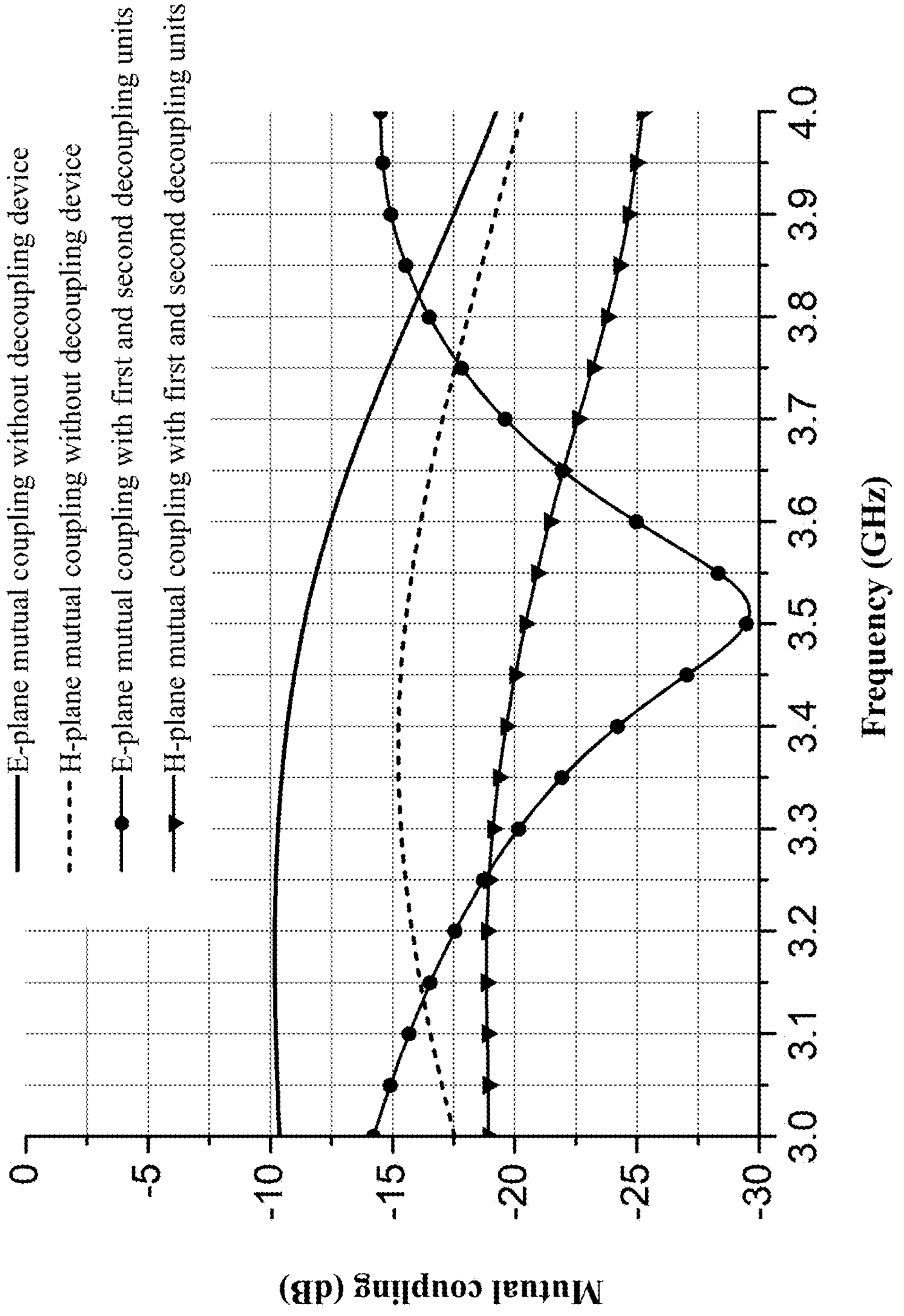
FIG. 11 is a graph of E-plane and H-plane mutual coupling when only first decoupling units and second decoupling units are used in an implementation (two-element sub-array) provided by an embodiment of the present disclosure.

FIG. 11 is a graph of E-plane and H-plane mutual coupling when the first decoupling units and the second decoupling units are used. After using the first decoupling units and the second decoupling units, in the frequency range of 3.4 to 3.6 GHz, E-plane mutual coupling is reduced by 10 dB, and H-plane mutual coupling is only reduced by 4 dB.

Figure 7:
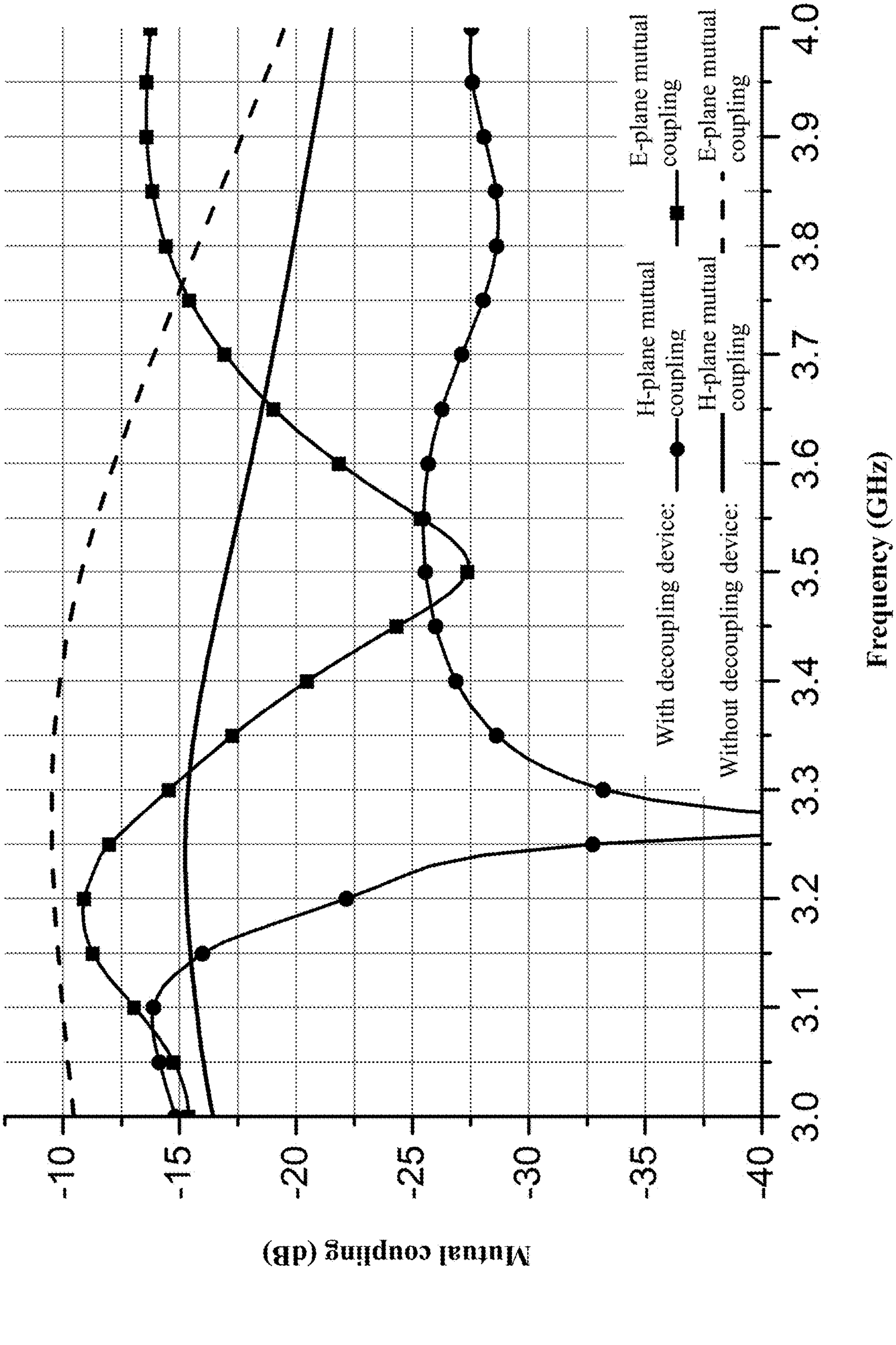
FIG. 7 is a graph of mutual coupling before and after using a decoupling device in an implementation provided by an embodiment of the present disclosure.

The third decoupling units change a phase of the H-plane scattered waves generated by the second decoupling units by means of resonance characteristics of the electrically large metal patch, making the H-plane scattered waves generated by the second decoupling units and the third decoupling units equal in amplitude and opposite in phase to the H-plane coupled waves, thus realizing H-plane decoupling. Meanwhile, the third decoupling units are located apart from the E-plane coupled antennas, and will not affect E-plane decoupling. As shown in FIG. 7, after using the first decoupling units, the second decoupling units and the third decoupling units, H-plane mutual coupling is less than 25 dB, which is 10 dB lower than that without a decoupling device.

Figure 12:
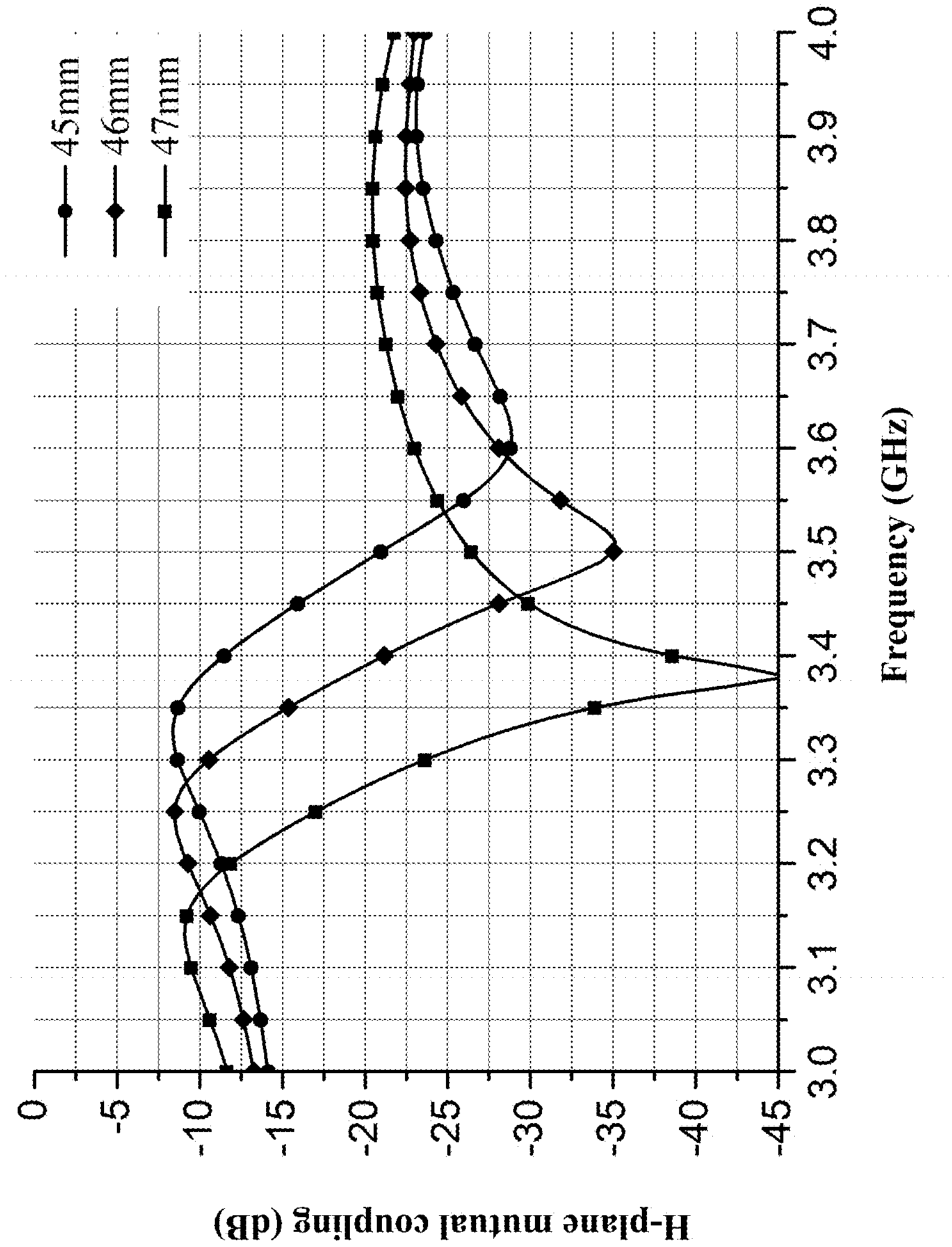
FIG. 12 is a graph of H-plane mutual coupling varying with the size of third decoupling units in an implementation provided by an embodiment of the present disclosure.

The size of the electrically large metal patch of the third decoupling unit directly determines the phase of the H-plane scattered waves. FIG. 12 shows a graph of H-plane mutual coupling varying with the size of the electrically large metal patch in a two-element sub-array. As the size of the electrically large metal patch becomes larger, an optimal decoupling frequency band of the H-plane moves to low frequency.

Through the joint action of the first decoupling units, the second decoupling units and the third decoupling units, both E-plane decoupling and H-plane decoupling are realized for the antennas.

Figure 13:
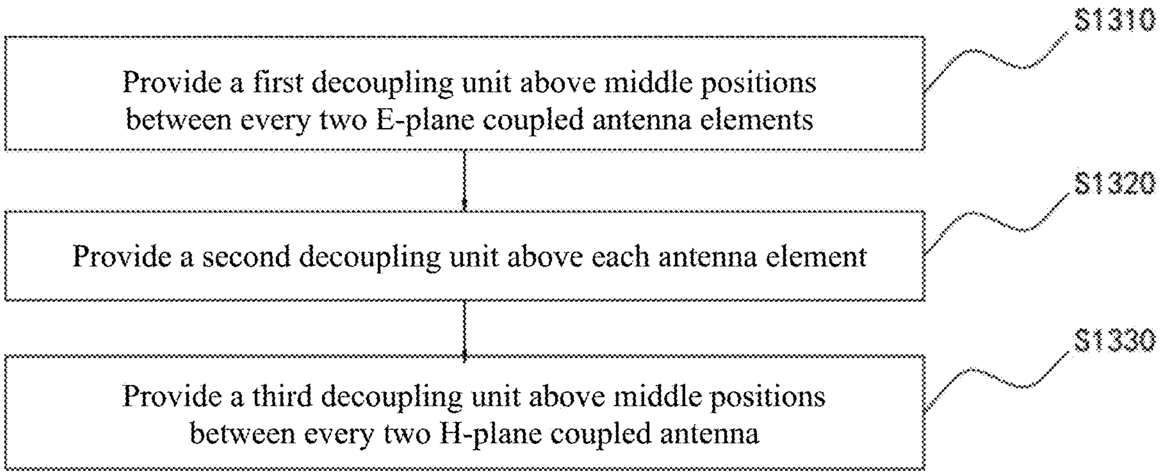
FIG. 13 is a flowchart of a decoupling method provided by an embodiment of the present disclosure.

In addition, referring to FIG. 13, an embodiment of a second aspect of the present disclosure provides a decoupling method applied to an antenna array, the antenna array includes a plurality of antenna elements, and the decoupling method includes the following steps:

- S1310, providing a first decoupling unit above a middle position between every two E-plane coupled antenna elements;
- S1320, providing a second decoupling unit above each antenna element;
- S1330, providing a third decoupling unit above a middle position between every two H-plane coupled antenna.

In this embodiment, the first decoupling units are arranged above the middle positions between every two E-plane coupled antenna elements and the second decoupling units are arranged above each antenna element, E-plane scattered waves with equal amplitude and opposite phase to E-plane coupled waves are generated by the first decoupling units and the second decoupling units, and the E-plane scattered waves and the E-plane coupled waves cancel each other out to realize E-plane decoupling; in addition, the second decoupling units will also generate H-plane scattered waves to realize partial H-plane decoupling; furthermore, the third decoupling units are arranged above the middle positions between every two H-plane coupled antenna elements, H-plane scattered waves with equal amplitude and opposite phase to H-plane coupled waves are generated by the second decoupling units and the third decoupling units, and the H-plane scattered waves and the H-plane coupled waves cancel each other out to realize H-plane decoupling; and through the joint action of the first decoupling units, the second decoupling units and the third decoupling units, both E-plane decoupling and H-plane decoupling are realized for the antenna array.

In an embodiment, the first decoupling unit includes a first metal patch or a plurality of first metal patches arranged in an H-plane direction, and a geometric center of the first decoupling unit is located directly above the middle position between the two corresponding E-plane coupled antenna elements.

Here, the first metal patch may be rectangular, triangular, circular, cross-shaped, I-shaped, C-shaped or in other similar shapes, and a size of the first metal patch ranges from 0.01λc to 0.25λc, where λc is a wavelength of electromagnetic waves corresponding to a central frequency of the antenna array. The first metal patch in this size range is an electrically small metal patch. Electromagnetic scattered waves of the electrically small metal patch structure are isotropic, meaning that the amplitudes and phases of scattered waves in different directions are equal at the same distance. In addition, the first metal patch can be sleeved with a first metal ring, or each first metal patch includes a plurality of metal patch pieces arranged in a direction perpendicular to the H-plane direction, or each first metal patch includes a plurality of metal patch pieces stacked in layers, and the first metal patch with different structures can achieve different decoupling effects.

In an embodiment, the decoupling method further includes the following step:

- adjusting the shape, quantity, height or size of the first metal patches, such that E-plane scattered waves generated by the first decoupling units are equal in amplitude and opposite in phase to E-plane coupled waves.

E-plane scattered waves generated by the first decoupling units are equal in amplitude and opposite in phase to E-plane coupled waves, and the E-plane scattered waves and the E-plane coupled waves cancel each other out to realize E-plane decoupling.

In an embodiment, the second decoupling unit includes a second metal patch or a plurality of second metal patches arranged in an E-plane direction, and a geometric center of the second decoupling unit is located directly above the corresponding antenna element.

Here, the second metal patch may be rectangular, triangular, circular, cross-shaped, I-shaped, C-shaped or in other similar shapes, and a size of the second metal patch ranges from 0.01λc to 0.25λc, where λc is a wavelength of electromagnetic waves corresponding to a central frequency of the antenna array. The second metal patch in this size range is an electrically small metal patch. Electromagnetic scattered waves of the electrically small metal patch structure are isotropic, meaning that the amplitudes and phases of scattered waves in different directions are equal at the same distance. In addition, the second metal patch can be sleeved with a second metal ring, or each second metal patch includes a plurality of metal patch pieces arranged in a direction perpendicular to the E-plane direction, or each second metal patch includes a plurality of metal patch pieces stacked in layers, and the second metal patch with different structures can achieve different decoupling effects.

In an embodiment, the decoupling method further includes the following step:

- adjusting the shape, quantity, height or size of the second metal patches, such that H-plane scattered waves generated by the second decoupling units are equal in amplitude to H-plane coupled waves.

H-plane scattered waves generated by the second decoupling units can realize partial H-plane decoupling.

In an embodiment, the third decoupling unit includes a third metal patch or a plurality of third metal patches stacked in layers, and a geometric center of the third decoupling unit is located directly above the middle position between the two corresponding H-plane coupled antenna elements.

The third decoupling unit can be composed of only one third metal patch, or a plurality of third metal patches stacked in layers to achieve different decoupling effects. The third metal patch may be rectangular, triangular, circular, cross-shaped, I-shaped, C-shaped or in other similar shapes, and a size of the third metal patch ranges from 0.40λc to 0.80λc, where λc is a wavelength of electromagnetic waves corresponding to a central frequency of the antenna array. The third metal patch in this size range is an electrically large metal patch, and the electrically large size refers to both the physical length and the length through which an effective current flows, that is, electrical length. In addition, the third metal patch can be sleeved with a third metal ring. The nested metal patch structure helps reduce the physical size of the electrically large metal patch, increase the amplitude of the scattered waves and improve the decoupling effect.

In an embodiment, the decoupling method further includes the following step:

adjusting the shape, number of layers, height or size of the third metal patch, such that H-plane scattered waves generated by the second decoupling units and the third decoupling units are equal in amplitude and opposite in phase to H-plane coupled waves.

H-plane scattered waves equal in amplitude and opposite in phase to H-plane coupled waves are generated by the second decoupling units and the third decoupling units, and the H-plane scattered waves and the H-plane coupled waves cancel each other out to realize H-plane decoupling.

Next, the decoupling method provided in this application will be explained with several embodiments.

The method for realizing dual-mode decoupling applied to a planar antenna array provided by this example includes the following steps.

In step 1, first decoupling units 120 are provided, and the first decoupling unit is composed of an electrically small first metal patch 121 or a plurality of electrically small first metal patches 121. In response to the first decoupling unit 120 being composed of a plurality of electrically small first metal patches 121, the plurality of first metal patches 121 are arranged in an H-plane direction of antennas, and geometric centers of the first decoupling units 120 are located directly above middle positions between every two E-plane coupled antenna elements. By adjusting the size, height, quantity, shape and number of layers of the first metal patches 121, E-plane scattered waves generated by the first decoupling units 120 are made to be equal in amplitude and opposite in phase to E-plane coupled waves, thus realizing E-plane antenna decoupling.

In step 2, second decoupling units 130 are provided, and the second decoupling unit 130 is composed of an electrically small second metal patch 131 or a plurality of electrically small second metal patches 131. In response to the second decoupling unit 130 being composed of a plurality of electrically small second metal patches 131, the plurality of second metal patches 131 are arranged in an E-plane direction of antennas. To prevent the second decoupling units 130 from generating a significant impact on the first decoupling units 120, the second metal patches 131 are arranged from outside to inside, starting at two ends of the antenna. Geometric centers of the second decoupling units 130 are located directly above each antenna element. By adjusting the size, quantity, shape, and number of layers of the second metal patches 131, H-plane scattered waves generated by the second decoupling units 130 are made to be equal in amplitude to H-plane coupled waves.

In step 3, the first decoupling units 120 are optimized, and the size of the first metal patch 121 is adjusted to correct the influence on the E-plane scattered waves caused by the introduction of the second decoupling units 130, so as to ensure E-plane decoupling.

In step 4, third decoupling units 140 are provided, the third decoupling unit 140 is composed of an electrically large third metal patch 141 or a plurality of electrically large third metal patches 141 stacked in layers, and geometric centers of the third decoupling units 140 are located directly above middle positions between every two H-plane coupled antenna elements. By adjusting the size of the third metal patch 141 and utilizing resonance characteristics of the third decoupling unit 140, H-plane scattered waves generated by the second decoupling units 130 are made to be opposite in phase to H-plane coupled waves, thus realizing H-plane antenna decoupling.

In step 5, the second decoupling units 130 are optimized, and the size of the second metal patch 131 is adjusted to correct the influence caused by the introduction of the third decoupling units 140, so as to ensure H-plane decoupling.

In step 6, the first decoupling units 120, the second decoupling units 130 and the third decoupling units 140 are expanded along the x axis and the y axis according to the scale of the planar MIMO antennas, so as to obtain the decoupling device which can realize both E-plane decoupling and H-plane decoupling for the antennas.

Due to the symmetry of the decoupling units, this method is not only applicable to single-polarized antenna arrays but also suitable for dual-polarized antenna arrays.

The decoupling device and the decoupling method provided by the embodiments of the present disclosure can realize more coupled wave suppression in a dual-polarized MIMO antenna array and obtain a better coupling effect; and decoupling in any direction in a two-dimensional space can be realized, providing greater flexibility for base station antenna decoupling.

The embodiments of the present disclosure provide the decoupling device and the decoupling method, where the first decoupling units are arranged above the middle positions between every two E-plane coupled antenna elements and the second decoupling units are arranged above each antenna element, E-plane scattered waves with equal amplitude and opposite phase to E-plane coupled waves are generated by the first decoupling units and the second decoupling units, and the E-plane scattered waves and the E-plane coupled waves cancel each other out to realize E-plane decoupling; in addition, the second decoupling units will also generate H-plane scattered waves to realize partial H-plane decoupling; furthermore, the third decoupling units are arranged above the middle positions between every two H-plane coupled antenna elements, H-plane scattered waves with equal amplitude and opposite phase to H-plane coupled waves are generated by the second decoupling units and the third decoupling units, and the H-plane scattered waves and the H-plane coupled waves cancel each other out to realize H-plane decoupling; and through the joint action of the first decoupling units, the second decoupling units and the third decoupling units, both E-plane decoupling and H-plane decoupling are realized for the antenna array.

Although the embodiments of the present disclosure have been described in detail above with reference to the accompanying drawings, the present disclosure is not limited to the above embodiments, and various changes may be made within the knowledge of those having ordinary skill in the art without departing from the purpose of the present disclosure.

What is claimed is:

1. A decoupling device, which is applied to an antenna array comprising a plurality of antenna elements, the decoupling device comprising:

a dielectric substrate located above the antenna elements;

first decoupling units arranged on the dielectric substrate, each first decoupling unit being located above a middle position between every two E-plane coupled antenna elements;

second decoupling units arranged on the dielectric substrate, the second decoupling units being located above each antenna element; and third decoupling units arranged on the dielectric substrate, each third decoupling unit being located above a middle position between every two H-plane coupled antenna elements;

wherein each of third decoupling units comprises a third metal patch or a plurality of third metal patches stacked in layers, and a length of the third metal patch in the H-plane direction ranges from 0.40λc to 0.80λc, where λc is a wavelength of electromagnetic waves corresponding to a central frequency of the antenna array.

2. The decoupling device of claim 1, wherein each of the first decoupling units comprises a first metal patch or a plurality of first metal patches arranged in an H-plane direction, and a geometric center of each of the first decoupling units is located directly above the middle position between the two corresponding E-plane coupled antenna elements.

3. The decoupling device of claim 2, wherein each first metal patch comprises a plurality of metal patch pieces arranged in a direction perpendicular to the H-plane direction.

4. The decoupling device of claim 2, wherein each first metal patch comprises a plurality of metal patch pieces stacked in layers.

5. The decoupling device of claim 2, wherein the first metal patch is sleeved with a first metal ring.

6. The decoupling device of claim 2, wherein a length of the first metal patch in the H-plane direction ranges from 0.01 λc to 0.25 λc, where λc is a wavelength of electromagnetic waves corresponding to a central frequency of the antenna array.

7. The decoupling device of claim 1, wherein each of the second decoupling units comprises a second metal patch or a plurality of second metal patches arranged in an E-plane direction, and a geometric center of each of the second decoupling units is located directly above the corresponding antenna element.

8. The decoupling device of claim 7, wherein:

each second metal patch comprises a plurality of metal patch pieces arranged in a direction perpendicular to the E-plane direction; or each second metal patch comprises a plurality of metal patch pieces stacked in layers.

9. The decoupling device of claim 7, wherein the second metal patch is sleeved with a second metal ring.

10. The decoupling device of claim 7, wherein a length of the second metal patch in the E-plane direction ranges from 0.01 λc to 0.25 λc, where λc is a wavelength of electromagnetic waves corresponding to a central frequency of the antenna array.

11. The decoupling device of claim 1, wherein the third metal patch is sleeved with a third metal ring.

12. A decoupling method, which is applied to an antenna array comprising a plurality of antenna elements, the decoupling method comprising:

providing a first decoupling unit above a middle position between every two E-plane coupled antenna elements;

providing a second decoupling unit above each antenna element; and providing a third decoupling unit above a middle position between every two H-plane coupled antenna elements;

wherein the third decoupling unit comprises a third metal patch or a plurality of third metal patches stacked in layers, and a length of the third metal patch in the H-plane direction ranges from 0.40 λc to 0.80 λc, where λc is a wavelength of electromagnetic waves corresponding to a central frequency of the antenna array.

13. The decoupling method of claim 12, wherein the first decoupling unit comprises a first metal patch or a plurality of first metal patches arranged in an H-plane direction, and a geometric center of the first decoupling unit is located directly above the middle position between the two corresponding E-plane coupled antenna elements.

14. The decoupling method of claim 13, further comprising:

adjusting the shape, quantity, height or size of the first metal patches, such that E-plane scattered waves generated by the first decoupling unit are equal in amplitude and opposite in phase to E-plane coupled waves.

15. The decoupling method of claim 12, wherein the second decoupling unit comprises a second metal patch or a plurality of second metal patches arranged in an E-plane direction, and a geometric center of the second decoupling unit is located directly above the corresponding antenna element.

16. The decoupling method of claim 15, further comprising:

adjusting the shape, quantity, height or size of the second metal patches, such that H-plane scattered waves generated by the second decoupling unit are equal in amplitude to H-plane coupled waves.

17. The decoupling method of claim 12, further comprising:

adjusting the shape, number of layers, height or size of the third metal patch, such that H-plane scattered waves generated by the second decoupling unit and the third decoupling unit are equal in amplitude and opposite in phase to H-plane coupled waves.

* * * * *